Figure 1:
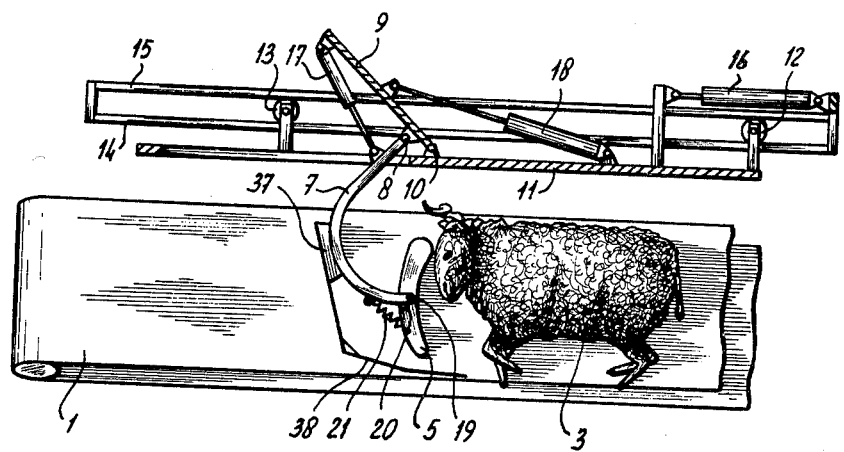

United States Patent [19]

Nijhuis

[11] 4,361,932
[45] Dec. 7, 1982

[54] APPARATUS FOR ELECTRICALLY STUNNING SLAUGHTER CATTLE

[75] Inventor: Johan W. Nijhuis, Winterswijk, Netherlands

[73] Assignee: Machinefabriek G.J. Nijhuis B.V., Winterswijk, Netherlands

[21] Appl. No.: 293,882

[22] Filed: Aug. 18, 1981

[30] Foreign Application Priority Data

Aug. 19, 1980 [NL] Netherlands ................. 8004688

[51] Int. Cl.³ .................................... A22B 3/06
[52] U.S. Cl. ............................................ 17/1 E
[58] Field of Search ........................ 17/1 E, 11 R, 1

[56] References Cited

U.S. PATENT DOCUMENTS

| 1,857,658 | 5/1932 | Pfretzschner | 17/1 E |
| 2,185,949 | 1/1940 | Regensburger | 17/1 |
| 3,996,644 | 12/1976 | Andersson | 17/1 E X |

FOREIGN PATENT DOCUMENTS 6702456 8/1967 Netherlands ................. 17/1 E 7904935 12/1980 Netherlands ................. 17/1 E Primary Examiner—Willie G. Abercrombie
Attorney, Agent, or Firm—Arnold, White & Durkee

[57] ABSTRACT

The present invention relates to an apparatus for electrically stunning slaughter cattle in particular horned cattle such as horned sheep. Said apparatus having a set of electrodes 4, 5, 22, 29 mounted at the outer ends of levers 6, 7, 24, 25, 31, 32 which can extend into the passage between the endless conveyor belts 1, 2 in a forward, inward and rearward direction said electrodes preferably being pivotably mounted at the outer ends of said levers by means of transverse pivot shafts 19 or selfcentering resilient universal joints, means being provided to swing the electrodes 4, 5 out of said passage which means can be formed by the cylinder 18 or by mounting the levers 24, 25 upon a shaft 26 which can be rotated and carry the plurality of levers with electrodes, or by using endless chains 33 carrying a plurality of levers 31, 32 with electrodes 29, 30 which chains can be driven in the direction of movement of the conveyor belts 1, 2.

13 Claims, 4 Drawing Figures

U.S. Patent Dec. 7, 1982 Sheet 1 of 2 4,361,932

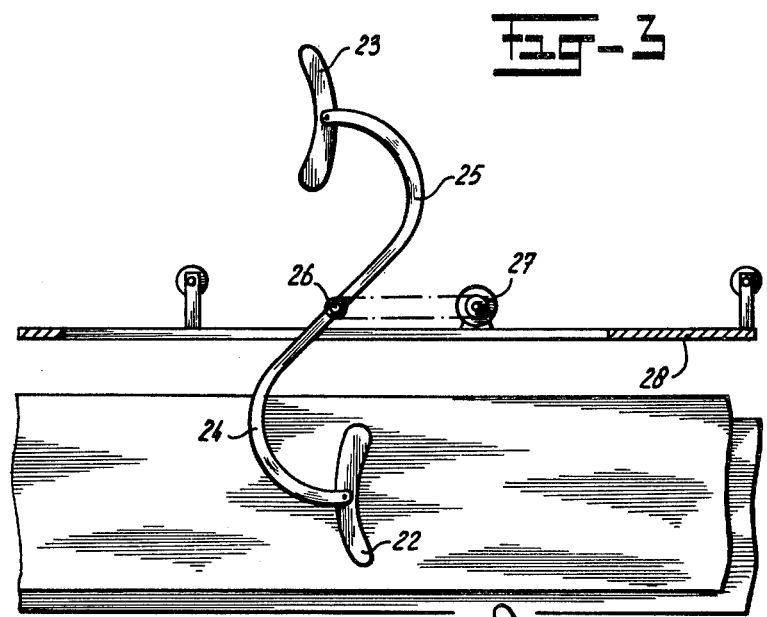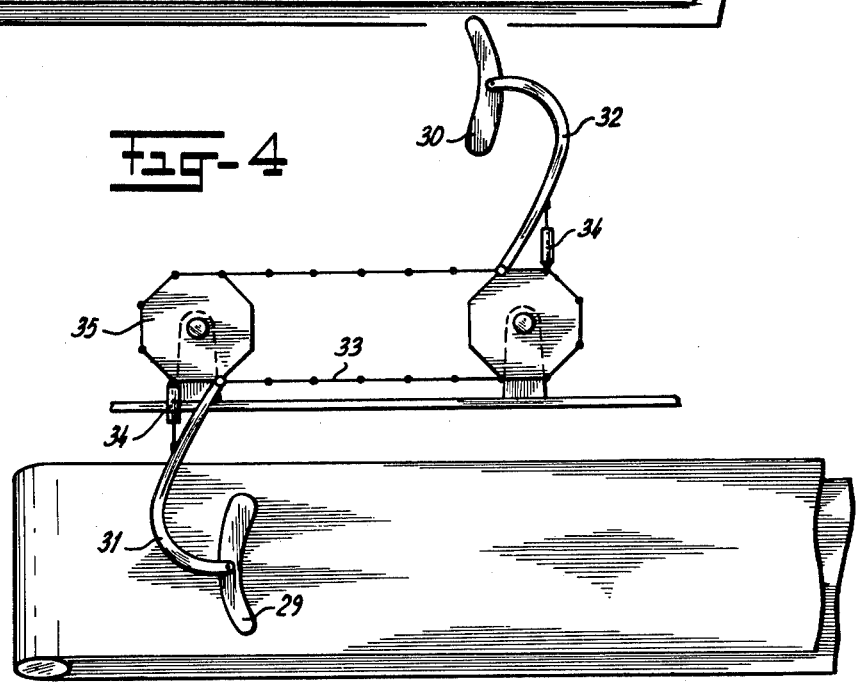

APPARATUS FOR ELECTRICALLY STUNNING SLAUGHTER CATTLE

CROSS-REFERENCE TO RELATED APPLICATIONS

This application discloses subject matter related to application, Ser. No. 299,541, filed Sept. 4, 1981, which is a continuation-in-part of application, Ser. No. 202,322, filed Oct. 30, 1980, which was a continuation of application, Ser. No. 905,371, filed May 12, 1978, now abandoned; this application is also related to application, Ser. No. 161,298, filed June 20, 1980, application, Ser. No. 147,826, filed May 8, 1980, application, Ser. No. 147,827, filed May 8, 1980, now U.S. Pat. No. 4,338,700, application, Ser. No. 148,033, filed May 8, 1980, now abandoned, and application, Ser. No. 148,034, filed May 8, 1980, now U.S. Pat. No. 4,319,383.

The invention relates to an apparatus for electrically stunning slaughter cattle, comprising a pair of endless conveyor means placed next and parallel to each other such that between them a V-shaped passage is formed defined by the opposite part of the conveyor means, which parts can move with the same speed in the same direction and can carry the body of an animal, as well as a set of electrodes placed next to each other and extending into the passage which electrode can move together with the conveying means and can be swung out of the part of the animal.

A device of this kind has been proposed in the non-prepublished older Dutch patent application No. 7904935. In said apparatus the electrodes placed next to each other have a shape adapted to the head of the animal to be stunned, the apparatus being more in particular meant for pigs. Said apparatus can also be used for stunning sheep. There however are sheep races the animals of which carry horns. In that case the apparatus is not suitable because the horned sheep press the electrodes upwardly with the horns and since said horns do not guide the current proper stunning does not take place but most damage of the animal if the electrodes after having passed the head still come into contact with the body.

Purpose of the invention is to provide an apparatus which is universely applicable, which means can be used for horned and unhorned animals, the dimensions of the apparatus only being defined by the size of the animal and the shape of the head can be of influence in designing the profile of the electrode plates.

According to the invention this purpose in the first place is achieved in that the electrodes are mounted upon levers which extend into the passage oblically forwardly and inwardly and subsequently against the direction of movement which levers are connected with a device by means of which the levers with the electrodes can be swung out of the passage and out of the path of the animal. Electrodes formed in this way cannot be reached by the horns of a horned animal because the horns normally are at a higher level than the snout of the animal. The horns then remain out of reach of the levers by means of which the electrodes can be swung away.

In an apparatus in which the electrodes are swingably mounted upon a carriage movable in the longitudinal direction of the apparatus, the levers with electrodes can be swung upwardly by means of a cylinder so that after stunning the electrodes are positively moved out of the path of the animal and accordingly remain out of the reach of the horns.

According to the invention a shaft may be placed upon such a carriage having a plurality of sets of electrodes on levers extending radially from the shaft, which shaft with levers and electrodes can be rotated by means of a driving device. This opens the possibility to desing the apparatus such that with the swinging upwardly of one set of electrodes the next set swings into the passage behind the just now stunned animal.

According to the invention it is possible as well to mount a plurality of sets of electrodes to one or more endless chains extending parallel to the direction of transportation. Said chains, in the same way as the above mentioned carriage start to move as soon as an animal comes into contact with the electrodes. At the end of the length of one chain part the chains with the electrode levers run around the front reversing wheel and swing upwardly. At the same time another set of electrodes can move downwardly into the V-shaped passage.

Horned animals tend to resist agressively. If this happens the animal moves its head downwardly with horns pointed forwardly. The risk then exists that proper contact with the electrodes is not made. To aviod this the electrodes can be mounted pivotably about a transverse axis at the end of the levers. The horns of the animal then automatically move the electrodes into a position in which the electrodes in the correct way snuggle against the downwardly directed snout. Said rotatable electrodes in the starting position can be held against an abutment by a spring such that they are free to pivot away with the upper end against the force of the spring.

However the electrodes also can be connected to the outer ends of levers by means of a universal resilient connection for instance by means of a rubber bloc or means of a self centering ball joint.

To avoid that the animal directs the head downwardly a protective plate can be connected to the electrode levers closing at the front side and lower side the slit between the conveyor means. Eventually the upper portion of said protective plate can be made as a mirror. The animal's attention then is lead away and the head remains directed forwardly.

Due to the fact that with the apparatus according to the invention the electrodes forcedly are moved out of the path of the stunned animal, damage of the animal's skin is avoided as well which damage might occur in case the animal itself has to swing the electrodes upwardly.

The invention now will be further elucidated with reference to the drawings.

Figure 2:
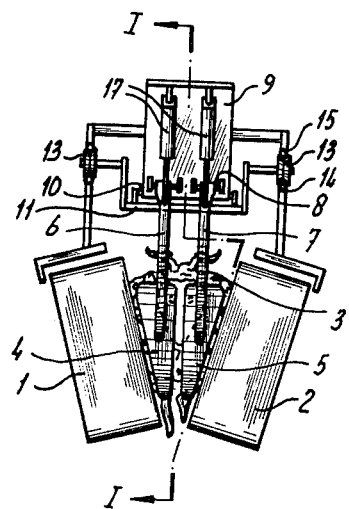

FIG. 1 in a cross section according to the line I—I of FIG. 2 shows an apparatus according to the invention.

FIG. 2 is a front view of the apparatus according to the invention.

FIG. 3 diagrammatically discloses a variant of the apparatus according to FIG. 1 and FIG. 4 shows still another embodiment.

The apparatus shown in FIGS. 1 and 2 comprises two endless conveyor belts 1 and 2. They are, as clearly shown in FIG. 2 located with respect to each other such that between the opposite parts of the conveyor belts a V-shaped passage is formed in which the animal 3 to be stunned can be taken up.

From above two electrodes 4 and 5 extend into said V-shaped passage which electrodes are mounted to levers 6 en 7 pivotably mounted at 8 to a support 9 which itself is swingably mounted at 10 to a carriage 11 which by means of wheels 12 and 13 is movable between guide tracks 14 en 15. A cylinder 16 performs the displacement.

The levers 7 are coupled with the support 9 via a spring damoer 17 and the support line is connected with the carriage by means of a pressure fluid cylinder 18.

The electrodes 4 and 5 may have the shape shown in FIG. 1 of which FIG. 1 gives the side view and FIG. 2 the front view. Said electrodes are formed by plates having a shape adapted to the shape of the head of the animal to be stunned.

At 19 the electrodes can be rotatably mounted upon a transverse axis to the rearwardly directed outer ends of the levers 6 and 7 respectively.

The can be suspended with the point of gravity below the pivot point 19 and accordingly automatically take the vertical position. It is possible as well to apply an abutment 20 cooperating with the levers 7 as well as a spring 21 keeping the electrodes in the desired starting position.

If the in FIG. 1 shown to be stunned animal 3 moves its head downwardly the horns will engage the upper portion of the electrodes 4 and 5. The electrodes then are pivoted by the animal itself in a position in which they come to lie against the animal's snout.

In the apparatus according to the older proposal the carriage 11 comes into movement by means of the cylinder 16 as soon as the electrodes by means of a control current running through the snout have established that with the electrodes an animal did come into contact having the correct electrical resistance after which the main current is switched on. During the short time that the main current is switched on the carriage moves with the conveyor belts.

With the apparatus according to the older proposal the electrodes run over the head and back of the animal during the return stroke of the carriage.

With the apparatus according to the invention at the end of the stunning, for instance by means of a time switch, the cylinder 18 will be put into operation and this cylinder swings the support 9 to the right about pivot point 10 due to which the levers 6 and 7 with the electrodes 4 and 5 move forwardly and upwardly out of the passage. After the passage of the stunned animal the cylinder 18 returns the electrodes into the passage.

Since a rather large space is necessary to free the passage through which space the stunned animal has to move before the electrodes may return into the passage, it may, according to the invention be useful to use an apparatus as diagrammatically shown in FIGS. 3 or 4.

FIG. 3 shows electrode sets 22 and 23 connected with the levers 24, 25 to a shaft 26 which may be driven stepwise by a motor 27. During the upwardly swinging of the electrodes 22 the carriage 28 may move backwardly while simultaneously the electrodes 23 move downwardly and enter into the passage behind the animal.

With the embodiment of FIG. 4 the electrode sets 29 and 30 are connected with their levers 31 and 32 pivotably to the links 33 of an endless chain. Said connection can be pivotably through the intermediance of a resilient shock absorber 34. Upon running around the chain wheel 35 the levers 31 with electrodes 29 swing upwardly whereas levers 32 with electrodes 30 may move downwardly into the passage. This downward movement can take place similtaneously with, later or earlier than the upward movement of the electrodes 29 which depends from the distance between the animals, their length and the distance between the reversing wheels.

Instead of pivot axis 19 the electrodes 4 and 5, 22, 23 and 29, 30 can be connected to the outer ends of their levers through the intermediance of rubber blocks or self centering ball joints, due to which automatic adaptation can take place to the existing position of the head.

As shown in FIG. 1 the levers 6 and 7 may carry a plate 37 having a more horizontally extending lower portion 38 closing the slit between the lower ends of the conveyors. The animal tends to look there where it sees light and by closing the lower side it will be less inclined to move its head downwardly. The closing towards the front has the result that the animal maintains the head upwardly.

The plate 37 at the side turned towards the animal may be made as a mirror. The animal then is distracted because through the slot between the electrodes it sees itself and looks in that direction.

I claim:

1. Apparatus for the electrical stunning of slaughter catter, comprising:
   a pair of endless conveyor means placed next and parallel to each other such that between them a V-shaped passage is formed defined by the opposite parts of the conveyor means, which parts can move with the same speed in the same direction and may carry the body of an animal;
   a set of electrodes located next to each other, the electrodes being adapted to extend into the passage, the electrodes being adapted to move with the conveyor device, the electrodes being swingable out of the path of the animal, the electrodes being mounted upon levers, the levers having an initial portion that extends forwardly and inwardly within the passage, and the levers having a subsequent portion that curves and extends against the direction of movement, the levers being connected to a device by means of which the levers with the electrodes can be swung out of the passage and out of the path of the animal.

2. The apparatus according to claim 1, wherein the electrodes are swingably connected to a carriage which is movable in the longitudinal direction, the levers being adapted to swing upwardly by means of a cylinder.

3. The apparatus according to claim 1, wherein the electrodes are swingably connected to a carriage which is movable in the longitudinal direction, further comprising a plurality of sets of electrodes mounted upon levers radially extending from a shaft, which shaft with levers and electrodes can be rotated by means of a driving device.

4. The apparatus according to claim 1, further comprising a plurality of sets of electrodes mounted to one or more endless chains driven in synchronism, which chains extend parallel to the direction of transportation.

5. The apparatus according to claim 1, claim 2, claim 3 or claim 4, wherein the electrodes are pivotally connected about the transverse axis to the outer ends of the levers.

6. The apparatus according to claim 5, wherein the electrodes by a spring are kept in the starting position against an abutment and freely can swing away against spring pressure with the upper end.

7. The apparatus according to claim 1, claim 2, claim 3 or claim 4, wherein the electrodes are connected to the outer ends of the levers by universally movable resilient connecting means.

8. The apparatus according to claim 7, wherein the electrodes are connected by means of a block of rubber-like material.

9. The apparatus according to claim 1, claim 2, claim 3 or claim 4, further comprising a protective plate substantially covering the passage and being attached to the electrode levers, the protective plate covering the passage forwardly and downwardly in the direction of view of the animal to be stunned.

10. The apparatus according to claim 9, further comprising a mirror connected to the upper portion of the protective plate to distract the animal and to tend to make the animal look at its own image and thereby hold its head up.

11. An apparatus for automatically electrically stunning animals, comprising:
   two endless conveyor belts oriented generally parallel to each other and forming a V-shaped passageway, the conveyor belts being adapted to hold and restrain an animal within the V-shaped passageway;
   two electrodes adapted to contact the animal and deliver a stunning current to the animal;
   two levers, each lever being connected to one of the electrodes, the levers being adapted to extend into the V-shaped passageway in a forward, inward and rearward direction with respect to the movement of the conveyor belts;
   a support for the levers being pivotally attached to the support; and,
   means for swinging the levers and electrodes out of the V-shaped passageway and out of the path of the animal.

12. The apparatus according to claim 11, wherein the means for swinging comprises a cylinder.

13. The apparatus according to claim 11, wherein the electrodes are concave shaped with respect to the direction of movement of the animal.

* * * * *

UNITED STATES PATENT OFFICE
CERTIFICATE OF CORRECTION

Patent No. 4,361,932             Dated   December 7, 1982

Inventor(s)  Johan W. Nijhuis

It is certified that error appears in the above-identified patent and that said Letters Patent are hereby corrected as shown below:

Column 2, line 8, change "desing" to -- design --.

Column 3, line 7, change "damoer" to -- damper --; line 17, change "The" to -- They --; line 55, change "upwardly" to -- upward --.

Signed and Sealed this

Nineteenth Day of April 1983

[SEAL]

Attest:

GERALD J. MOSSINGHOFF

Attesting Officer      Commissioner of Patents and Trademarks